United States Patent Office 3,249,611
Patented May 3, 1966

3,249,611
NOVEL METHOD FOR THE PREPARATION
OF PHTHALAZINES
Arthur Hirsch, 6275 Northcrest Place, and Dimitrius Orphanos, 395 Cote Verto, both of Montreal, Quebec, Canada
No Drawing. Filed Mar. 31, 1965, Ser. No. 444,396
2 Claims. (Cl. 260—250)

This invention relates to a novel method for the preparation of phthalazine.

Phthalazine and its derivatives exhibit unique properties which have gained for them importance in the pharmaceutical, polymer, and other segments of the chemical industry.

It is an object of this invention to provide a novel method for the preparation of organic heterocyclic compounds. It is a further object of this invention to provide a novel method for the preparation of phthalazine and its derivatives. Further objects of this invention will become apparent from a reading of the following disclosure.

Phthalazine has been prepared in the past by one of the following methods: (a) According to W. Armarego, (J. Appl. chem., volume 11, page 70), hydrazine-phthalazine monohydrochloride was heated with copper sulfate; (b) E. Stephenson, (Chem. & Ind. 1957, page 174), catalytically reduced 1-chlorophthalazine with 5% palladium and charcoal; (c) S. Gabriel and J. Pinkers (Berichte, volume 26, page 2210), heated an aqueous suspension of tetrachloro or tetrabromo-orthoxylene with hydrazine; (d) V. Paul (Berichte volume 32, page 2410), reduced 1-chlorophthalazine with hydriodic acid and red phosphorous; and (e) R. Smith and E. Otremba (J. Org. Chem., volume 27, page 879–882), reacted an aqueous solution of o-phthalaldehyde with hydrazine sulfate in the presence of sodium hydroxide at 80° C.

All of these reactions, however, give poor yields of impure products. Smith and Otremba for example, report a 56% yield of a product melting at 87–90° C. The yellow color of the product obtained by this method furthermore attests to its impurity.

We have now found that by reacting a product having the general formula

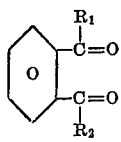

where $R_1$ and $R_2$ represent a radical independently selected from the group consisting of hydrogen and aliphatic and aromatic radicals, with hydrazine hydrate at temperatures between $-10°$ C. and $+25°$ C., one obtains a practically pure phthalazine derivative in almost quantitative yields. This unexpected result is more fully described in Example 1.

Example 1

A solution of 13.4 grams of o-phthalaldehyde is dissolved in 100 ml. of ethanol and added dropwise with constant stirring, under a blanket of nitrogen, to an ice-cooled solution of 15 grams of hydrazine hydrate in 100 ml. of ethanol. The rate of addition (approximately one hour) was adjusted to maintain the reaction mixture at 0° C. throughout. The light yellowish reaction mixture is kept with constant stirring at 0° C. for an additional hour. The solution is thereafter permitted to reach room temperature and kept at same for two hours. The ethanol, together with excess hydrazine and small amounts of water are removed under reduced pressure. There remains a yellowish oil, which on cooling, solidifies to a pale yellow solid. This product is placed overnight in a vacuum desiccator, containing concentrated sulfuric acid, in order to remove the last traces of hydrazine. The product thus obtained melts at 86 to 88° C. and weighs 12.8 grams (98.5% yield).

The crude phthalazine thus obtained is suitable for further reaction. It may be purified by dissolving it in diethyl ether and treating it with 0.5 grams of charcoal and filtering. The colourless solution, upon evaporation, yields a white hard prismic substance melting at 90–91° C. The loss from this purification is negligible and a yield of 12.5 grams (96%) of pure phthalazine is obtained.

The example cited is designed to illustrate our invention but shall not be construed to limit it thereto.

We claim:
1. A process for the production of a heterocyclic compound having the formula

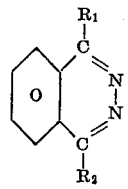

comprising reacting in an organic solvent at temperatures not to exceed 25° C., a compound having the formula

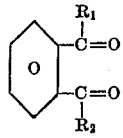

with hydrazine hydrate, herein $R_1$ and $R_2$ represent a radical independently selected from the group consisting of hydrogen and aliphatic and aromatic radicals.

2. A process for the production of phthalazine comprising reacting in an organic solvent at temperatures not to exceed 25° C., o-phthalaldehyde with hydrazine hydrate.

No references cited.

NICHOLAS S. RIZZO, *Primary Examiner.*

JAMES H. TURNIPSEED, *Assistant Examiner.*